(12) United States Patent
Kiyozuka (10) Patent No.: US 11,568,002 B2
(45) Date of Patent: Jan. 31, 2023

(54) INFORMATION PROCESSING APPARATUS AND NON-TRANSITORY COMPUTER READABLE MEDIUM

(71) Applicant: FUJIFILM Business Innovation Corp., Tokyo (JP)

(72) Inventor: Kensuke Kiyozuka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/338,680

(22) Filed: Jun. 4, 2021

(65) Prior Publication Data

US 2022/0107982 A1 Apr. 7, 2022

(30) Foreign Application Priority Data

Oct. 6, 2020 (JP) .............................. JP2020-169378

(51) Int. Cl.
*G06F 16/93* (2019.01)
*H04L 67/06* (2022.01)
*H04L 67/02* (2022.01)
*G06F 8/30* (2018.01)

(52) U.S. Cl.
CPC .............. *G06F 16/93* (2019.01); *H04L 67/02* (2013.01); *H04L 67/06* (2013.01); *G06F 8/31* (2013.01)

(58) Field of Classification Search
CPC .......... G06F 16/93; H04L 67/02; H04L 67/06
See application file for complete search history.

(56) References Cited

U.S. PATENT DOCUMENTS

| | | | |
|---|---|---|---|
| 10,180,944 B2 | 1/2019 | Kawamoto | |
| 2016/0042004 A1* | 2/2016 | Kawamoto | G06F 3/1454 715/739 |
| 2017/0033993 A1* | 2/2017 | Asai | G06F 3/1291 |
| 2019/0026057 A1* | 1/2019 | Matsu | G06F 16/40 |

FOREIGN PATENT DOCUMENTS

JP 2016038692 3/2016

* cited by examiner

*Primary Examiner* — Wing F Chan
*Assistant Examiner* — Billy H Ng
(74) *Attorney, Agent, or Firm* — JCIPRNET (57) ABSTRACT

An information processing apparatus includes a processor configured to: download, on a basis of service linkage information in which a download source address that corresponds to a storage source of an electronic document in a first document management service and an upload destination address that corresponds to a storage destination of an electronic document in a second document management service, which is different from the first document management service, are associated with each other, a target electronic document that is stored in the storage source corresponding to the download source address associated with the upload destination address to the information processing apparatus when a browser accesses the upload destination address; and upload the downloaded target electronic document to the storage destination corresponding to the upload destination address.

11 Claims, 8 Drawing Sheets

| RULE NAME | DOWNLOAD SOURCE ADDRESS | DOWNLOAD PROCEDURE | UPLOAD DESTINATION ADDRESS | UPLOAD PROCEDURE | DOCUMENT TYPE INFORMATION | CONFIRMATION NECESSITY INFORMATION |
|---|---|---|---|---|---|---|
| WRITTEN PROPOSAL REGISTRATION | http://neco.co.jp/anken/${CASE ID} | Click('downloadButton') | http://sws.com/process/list/${CASE ID}/${TRAIL ID} | SetFile('ringi-syo') Click('uploadButton') | PDF | TRUE |
| DEPARTMENT DISCUSSION TOPIC REGISTRATION | https://arc.workflow.co.jp/wf/processInstanceId=${DRAFTING NUMBER} | Click('getGian') | http://sws.com/process/list/${DRAFTING NUMBER}/gian | SetFile('gian') Click('uploadButton') | PDF/ DISCUSSION AGENDA | FALSE |
| WRITTEN ESTIMATE | https://np.co.jp/koubai/mits/${ESTIMATE ID} | Click('tab2') Click('print') | http://sws.com/process/list/${PURCHASE ID}/${ESTIMATE ID} | SetFile('mitsumori') Click('uploadButton') | PDF/ ESTIMATE | FALSE |
| ESTIMATE ATTACHMENT | https://np.co.jp/koubai/mits/${ESTIMATE ID} | Click('tenpu') | http://sws.com/process/list/${PURCHASE ID}/${ESTIMATE ID}/appendix | SetFile('mitsumori') Click('uploadButton') | UNSPECIFIED | FALSE |
| ... | ... | ... | ... | | ... | ... |

FIG. 7

FIG. 8

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-169378 filed Oct. 6, 2020.

BACKGROUND

(i) Technical Field

The present disclosure relates to an information processing apparatus and a non-transitory computer readable medium.

(ii) Related Art

There are known document management services for managing electronic documents. For example, a document management service is capable of managing an electronic document that is transmitted from an information processing apparatus, such as a personal computer or a multifunction machine, to a document management service.

In the related art, a plurality of document management services are provided, and users are able to allow a plurality of document management services to manage electronic documents. Here, there is a case where a user desires a process of transmitting an electronic document that is managed by a first document management service to a second document management service, which is different from the first document management service, and in the related art, there have been proposed technologies for performing this process.

Japanese Unexamined Patent Application Publication No. 2016-38692 discloses an information processing system that includes first and second storage servers each of which provides an electronic-document management service and an information processing apparatus including a browser. In a state where a browser of the information processing apparatus displays a content browsing screen that is acquired from the first storage server and a content browsing screen that is acquired from the second storage server, when a user performs an operation (drag-and-drop operation) of moving an icon that is included in the content browsing screen of the first storage server to a region that is included in the content browsing screen of the second storage server and that indicates a file storage location, an electronic document that corresponds to the icon is downloaded from the first storage server to the information processing apparatus, and subsequently, the electronic document is uploaded from the information processing apparatus to a specified storage destination in the second storage server.

For example, as in the system described in Japanese Unexamined Patent Application Publication No. 2016-38692, a user manually associates an electronic document managed by a first document management service with the storage destination of the electronic document in the second document management service, so that a process of uploading an electronic document managed by the first document management service to the second document management service (sometimes referred to as a "process of linking the first document management service and the second document management service" in the present specification) may be performed.

It is desired that the first document management service and the second document management service be more easily linked together compared with the case where the above association is performed by a user operation.

Note that, in order to link the first document management service and the second document management service more easily compared with the case where the above association is achieved by an operation performed by a user, it may be considered to use application programming interfaces (APIs) that are provided by the first document management service and the second document management service. However, building a collaboration system using API is often complicated, and this makes it difficult to construct the system. In addition, in order to construct a collaboration system using API, each of the first and second document management services needs to provide an API in the first place.

SUMMARY

Aspects of non-limiting embodiments of the present disclosure relate to facilitating an operation of uploading an electronic document stored in a first document management service to a second document management service compared with the case where an electronic document is uploaded from the first document management service to the second document management service by a user operation.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to: download, on a basis of service linkage information in which a download source address that corresponds to a storage source of an electronic document in a first document management service and an upload destination address that corresponds to a storage destination of an electronic document in a second document management service, which is different from the first document management service, are associated with each other, a target electronic document that is stored in the storage source corresponding to the download source address associated with the upload destination address to the information processing apparatus when a browser accesses the upload destination address; and upload the downloaded target electronic document to the storage destination corresponding to the upload destination address.

BRIEF DESCRIPTION OF THE DRAWINGS

An exemplary embodiment of the present disclosure will be described in detail based on the following figures, wherein.

DETAILED DESCRIPTION

Figure 1:
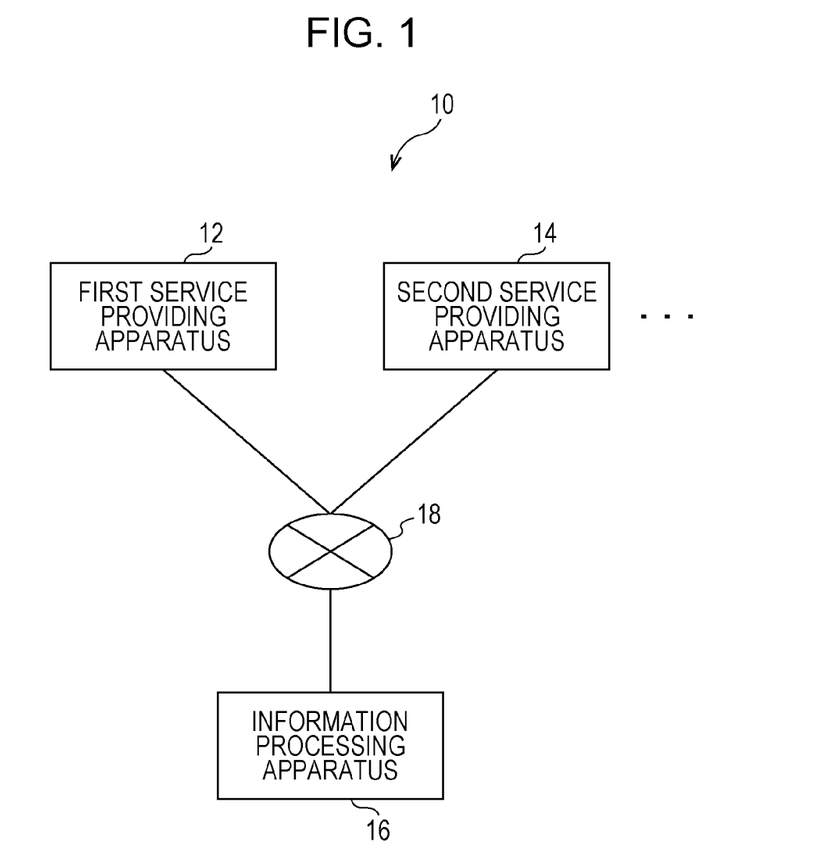
FIG. 1 is a schematic diagram illustrating a configuration of an information processing system according to the present exemplary embodiment.

FIG. 1 is a schematic diagram illustrating a configuration of an information processing system 10 according to the present exemplary embodiment. The information processing system 10 includes a first service providing apparatus 12, a second service providing apparatus 14, and an information processing apparatus 16 that is used by a user. The first service providing apparatus 12, the second service providing apparatus 14, and the information processing apparatus 16 are connected so as to be capable of communicating with one another by a communication line 18 such as a local area network (LAN) or the Internet.

The first service providing apparatus 12 and the second service providing apparatus 14 are each a web server and are each an apparatus that provides a document management service to a user via the communication line 18. In other words, the document management services provided by the first service providing apparatus 12 and the second service providing apparatus 14 are so-called cloud services. In particular, the first service providing apparatus 12 and the second service providing apparatus 14 each provide a document management service in the form of a website, that is, a collection of a plurality of web pages, to a user. In the present specification, the document management service that is provided by the first service providing apparatus 12 will be referred to as a first document management service, and the document management service that is provided by the second service providing apparatus 14 will be referred to as a second document management service. When there is no need to distinguish the first and second document management services from each other, they will be simply referred to as document management services.

A document management service is a service that stores an electronic document received from a user into a memory and provides the electronic document stored in the memory to the user in response to a request from the user. Note that, in the present specification, the term "download" refers to the case where the information processing apparatus 16 receives an electronic document from one of the document management services, and the term "upload" refers to the case where the information processing apparatus 16 transmits an electronic document to one of the document management services.

In addition, in each of the document management services, attribute information (described in detail later) that indicates the attribute of an electronic document may also be stored in a memory in association with the electronic document, and the attribute information may be provided to a user in response to a request from the user. Furthermore, electronic documents that are required for tasks may be registered beforehand on a task-by-task basis in each of the document management services, and a screen may be provided to a user so as to enable the user to determine whether a required electronic document has already been uploaded to the document management service.

Although the first service providing apparatus 12 and the second service providing apparatus 14 are each typically formed of a server computer, the first service providing apparatus 12 and the second service providing apparatus 14 may each be any apparatus as long as it is capable of providing a document management service to a user. For example, the first service providing apparatus 12 and the second service providing apparatus 14 each include a communication interface that includes a network adapter or the like and exhibits a function of communicating with other apparatuses via the communication line 18, a memory that includes a hard disk drive (HDD), read only memory (ROM), random access memory (RAM), or the like, and a processor that includes a central processing unit (CPU) or the like.

Note that, although FIG. 1 illustrates two service providing apparatuses, which are the first service providing apparatus 12 and the second service providing apparatus 14, the information processing system 10 includes three or more service providing apparatuses, and a user may use three or more document management services.

Figure 2:
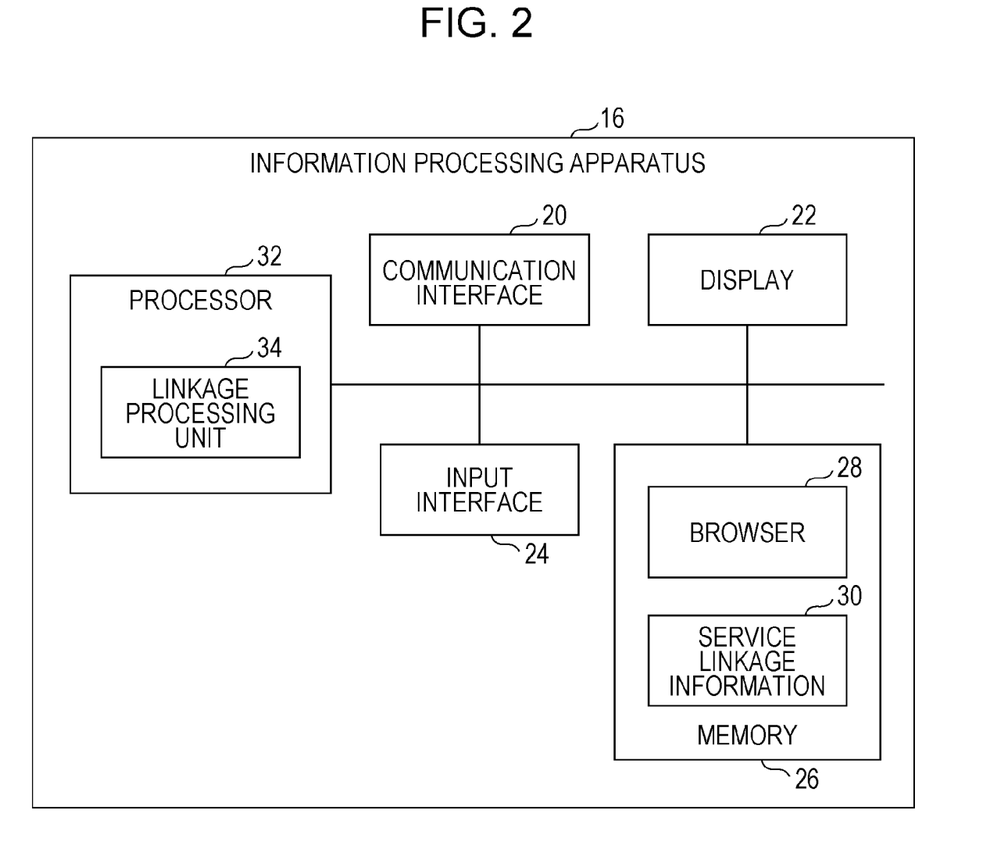
FIG. 2 is a schematic diagram illustrating a configuration of an information processing apparatus according to the present exemplary embodiment.

FIG. 2 is a schematic diagram illustrating a configuration of the information processing apparatus 16. Although a representative example of the information processing apparatus 16 is a personal computer, the information processing apparatus 16 may be any apparatus as long as it is capable of implementing functions which will be described below. For example, the information processing apparatus 16 may be a mobile terminal such as a tablet terminal or an image processing apparatus (e.g., a multifunction machine) having a scan function or the like.

A communication interface 20 includes, for example, a network adapter. The communication interface 20 exhibits a function of communicating with other apparatuses (e.g., the first service providing apparatus 12 and the second service providing apparatus 14) via the communication line 18.

A display 22 includes, for example, a liquid crystal panel. The display 22 displays various screens. For example, the display 22 displays a screen that is provided by the first document management service or the first document management service.

An input interface 24 includes, for example, a mouse, a keyboard, or a touch panel. The input interface 24 is used by a user in order to input various instructions to the information processing apparatus 16.

A memory 26 includes, for example, an HDD, a solid state drive (SSD), ROM, or RAM. The memory 26 may be provided separately from a processor 32, which will be described later, or at least a portion of the memory 26 may be included in the processor 32. The memory 26 stores information processing programs for causing each unit of the information processing apparatus 16 to operate. In addition, as illustrated in FIG. 2, the memory 26 stores a browser 28 and service linkage information 30.

The browser 28 is a program that is executed by the processor 32 and is a program for accessing a web page provided by a web server. In the browser 28, a uniform resource locator (URL) that is an identifier that identifies a web page may be specified by a user. When a user specifies a URL in the browser 28, the browser 28 accesses a web page indicated by the URL and displays the web page on the display 22 (specifically, a window in the browser 28). Note that various functions may be added to the browser 28 by a user in addition to the basic function of displaying a web page. Such functions that are added at a later time are called browser extensions, plug-ins, add-ons, or the like.

As mentioned above, the first document management service provided by the first service providing apparatus 12, which is a web server, and the second document management service provided by the second service providing apparatus 14, which is a web server, are each provided in the form of a website, that is, a collection of a plurality of web pages, and thus, a user may use the first or second document management service by accessing, through the browser 28, a web page provided by the first service providing apparatus 12 or the second service providing apparatus 14. Note that, in the present specification, to access the first service providing apparatus 12 in order to use the first document management service will sometimes be simply described as "to access the first document management service", and to access the second service providing apparatus 14 in order to use the second document management service will sometimes be simply described as "to access the second document management service". In addition, even if a process is executed by the first service providing apparatus 12 or the second service providing apparatus 14 in terms of hardware, it may sometimes be described as if the process is executed by the first document management service or the second document management service.

Figure 3:
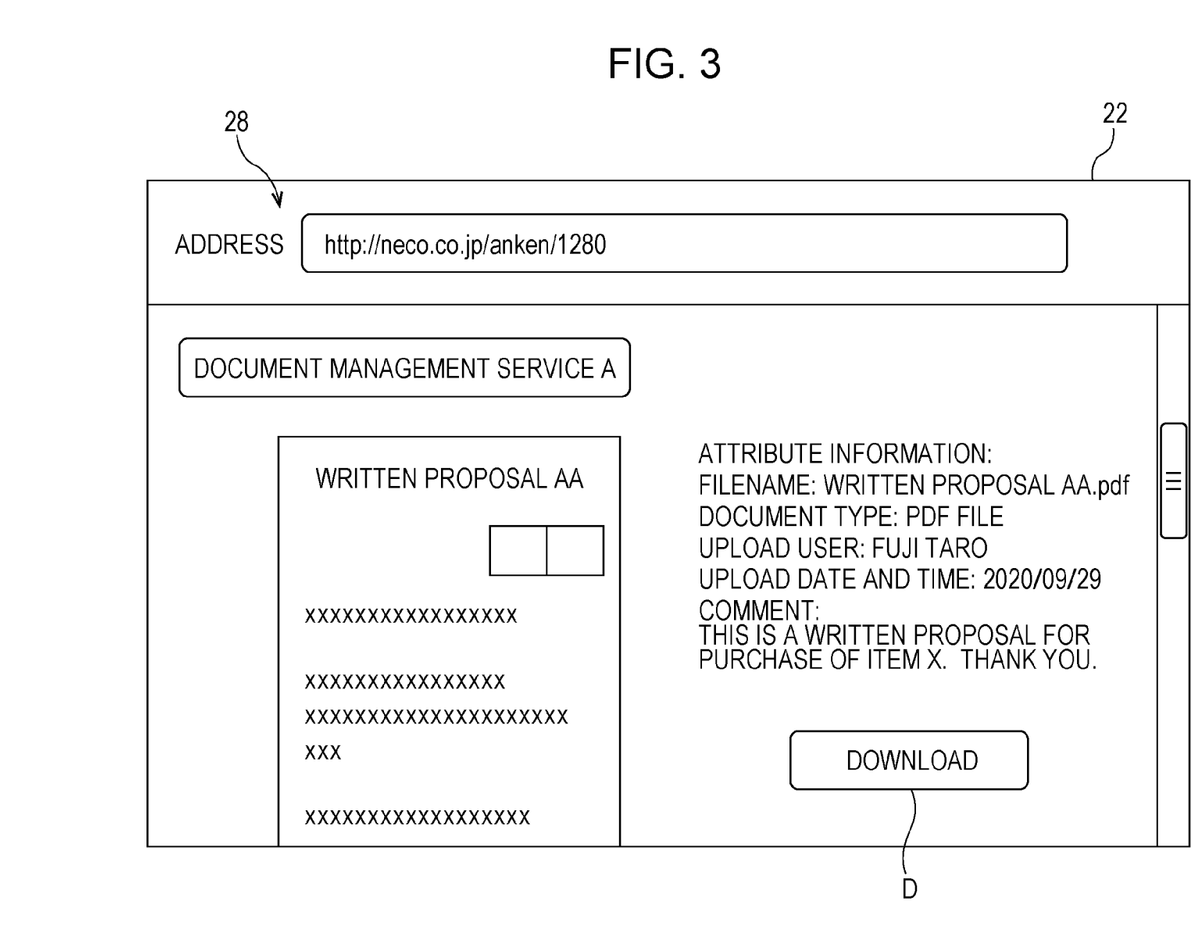
FIG. 3 is a diagram illustrating an example of a web page provided by a first document management service.

FIG. 3 is a diagram illustrating an example of a web page that is provided by the first document management service and that is displayed in the browser 28 (i.e., on the display 22) when the first document management service is accessed through the browser 28. FIG. 3 illustrates a web page that corresponds to the storage source of an electronic document that has already been managed in (that has already been uploaded to) the first document management service. It may also be said that such a web page is a web page for downloading an electronic document from the storage source of the electronic document in the first document management service (specifically, a predetermined memory address in the memory of the first service providing apparatus 12). In the case illustrated in FIG. 3, the URL of the web page corresponding to the storage source of the electronic document is "http://neco.co.jp/anken/1280". Thus, a user specifies the URL in the browser 28, so that the browser 28 may display the web page illustrated in FIG. 3.

A web page that corresponds to the storage source of an electronic document includes the attribute information of the electronic document in addition to the contents of the electronic document. The attribute information is information that indicates the attribute of an electronic document and is managed by the first document management service in association with the electronic document. When an electronic document is uploaded to the first document management service, the attribute information is given by an upload user or the first document management service.

The electronic document in the case illustrated in FIG. 3 is "written proposal AA.pdf". In the case illustrated in FIG. 3, the name of the electronic document (the filename), the document type of the electronic document, an upload user who has uploaded the electronic document to the first document management service, an upload date and time that is the date and time when the electronic document is uploaded to the first document management service, a comment on the electronic document made by the upload user or the like, and so forth are contained in the web page as attribute information items. Note that the attribute information items included in the web page corresponding to the storage source of the electronic document are not limited to these.

The web page corresponding to the storage source of the electronic document includes a download button D. The user operates the download button D by using the input interface 24, so that the electronic document may be downloaded to the information processing apparatus 16 from the storage source of the electronic document in the first document management service (specifically, a predetermined memory address in the memory of the first service providing apparatus 12).

Note that, although FIG. 3 illustrates the web page corresponding to the electronic document that has already been uploaded to the first document management service, the user may specify, in the browser 28, the URL of the web page for uploading the electronic document to the storage destination of the electronic document in the first document management service, so that the browser 28 may the web page for uploading the electronic document to the storage s destination in the first document management service.

Figure 4:
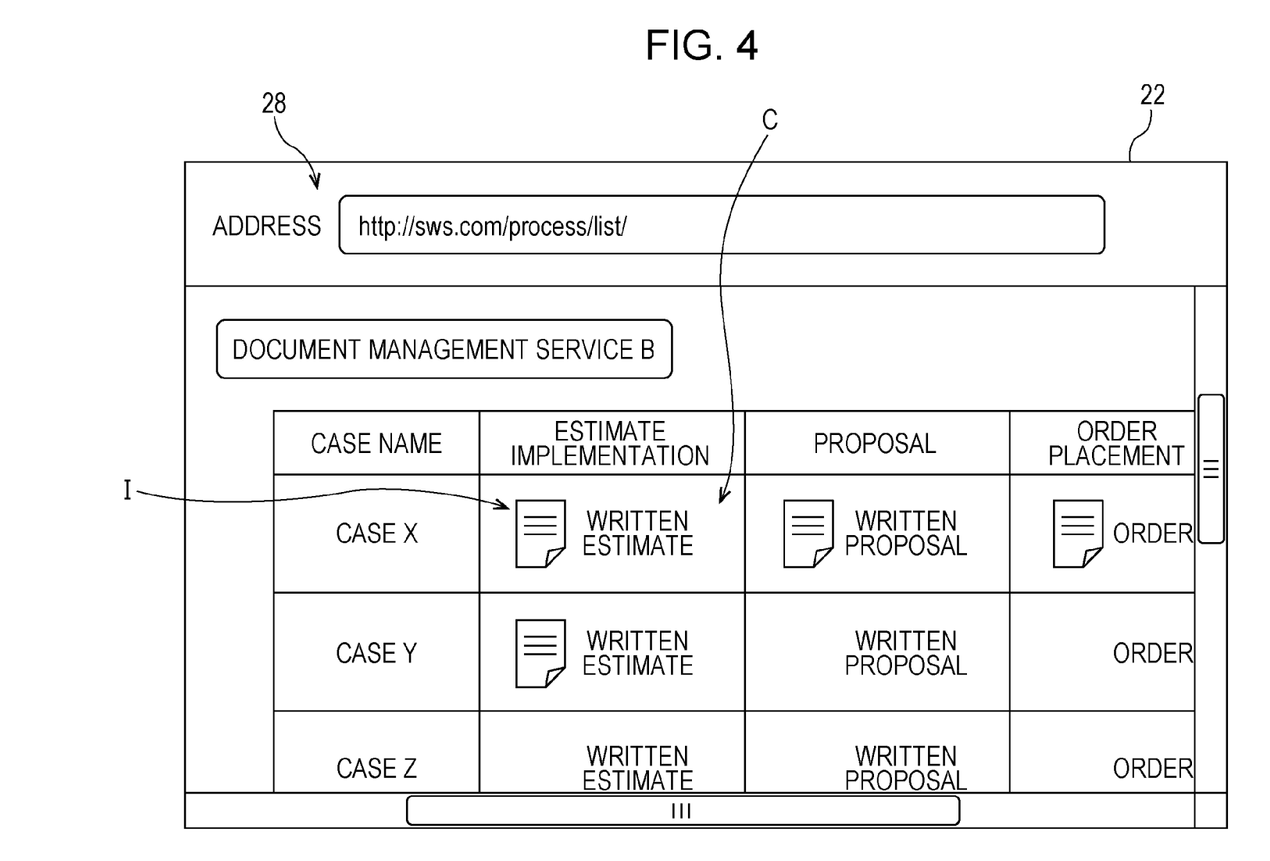
FIG. 4 is a diagram illustrating a first example of a web page provided by a second document management service.

FIG. 4 is a diagram illustrating an example of a web page that is provided by the second document management service and that is displayed in the browser 28 (i.e., on the display 22) when the second document management service is accessed through the browser 28. The URL of the web page is "http://sws.com/process/list/". Thus, a user specifies the URL in the browser 28, so that the browser 28 may display the web page illustrated in FIG. 4.

The web page illustrated in FIG. 4 is a web page indicating whether electronic documents that are required for accomplishing tasks have been uploaded to the second document management service. For example, the web page in FIG. 4 indicates that it is necessary to register electronic documents such as "written estimates", "written proposals", and "written orders" in the second document management service in order to accomplish a "case X", a "case Y", and a "case Z", each of which is one of the tasks. Such information relating to each task is registered beforehand in the second document management service by, for example, an administrator of the task. Note that, in the present specification, the types of electronic documents such as "written estimates", "written proposals", and "written orders" will be referred to as "trails".

In addition, the web page indicates whether the electronic documents, which are the trails relating to the tasks, have already been uploaded to the second document management service. More specifically, each of the trails with an icon I indicates that the electronic document corresponding to the trail has already been uploaded to the second document management service. In contrast, each of the trails without the icon I indicates that the electronic document corresponding to the trail has not yet been uploaded to the second document management service. For example, the web page in FIG. 4 indicates that the "written estimate" of the "case Y" has already been uploaded to the second document management service and that the "written proposal" of the "case Y" has not yet been uploaded to the second document management service.

When a user selects the trail of an electronic document that has already been uploaded (in the case illustrated in FIG. 4, when a user selects a cell C that corresponds to the trail of an electronic document that has already been uploaded), the URL of a web page that corresponds to the storage source of the electronic document (already uploaded) of the trail is specified in the browser 28, and the browser 28 displays the web page corresponding to the storage source of the electronic document of the trail. Such a web page may have contents similar to, for example, those of the web page illustrated in FIG. 3.

In contrast, when a user selects the trail of an electronic document that has not yet been uploaded (in the case illustrated in FIG. 4, when a user selects a cell C that corresponds to the trail of an electronic document that has not yet been uploaded), the URL of a web page that corresponds to the storage destination of the electronic document (not yet uploaded) of the trail is specified in the browser 28, and the browser 28 displays the web page corresponding to the storage destination of the electronic document of the trail. It may also be said that such a web page is a web page for uploading the electronic document of the trail to the storage destination in the second document management service (specifically, a predetermined memory address in the memory of the second service providing apparatus 14).

Figure 5:
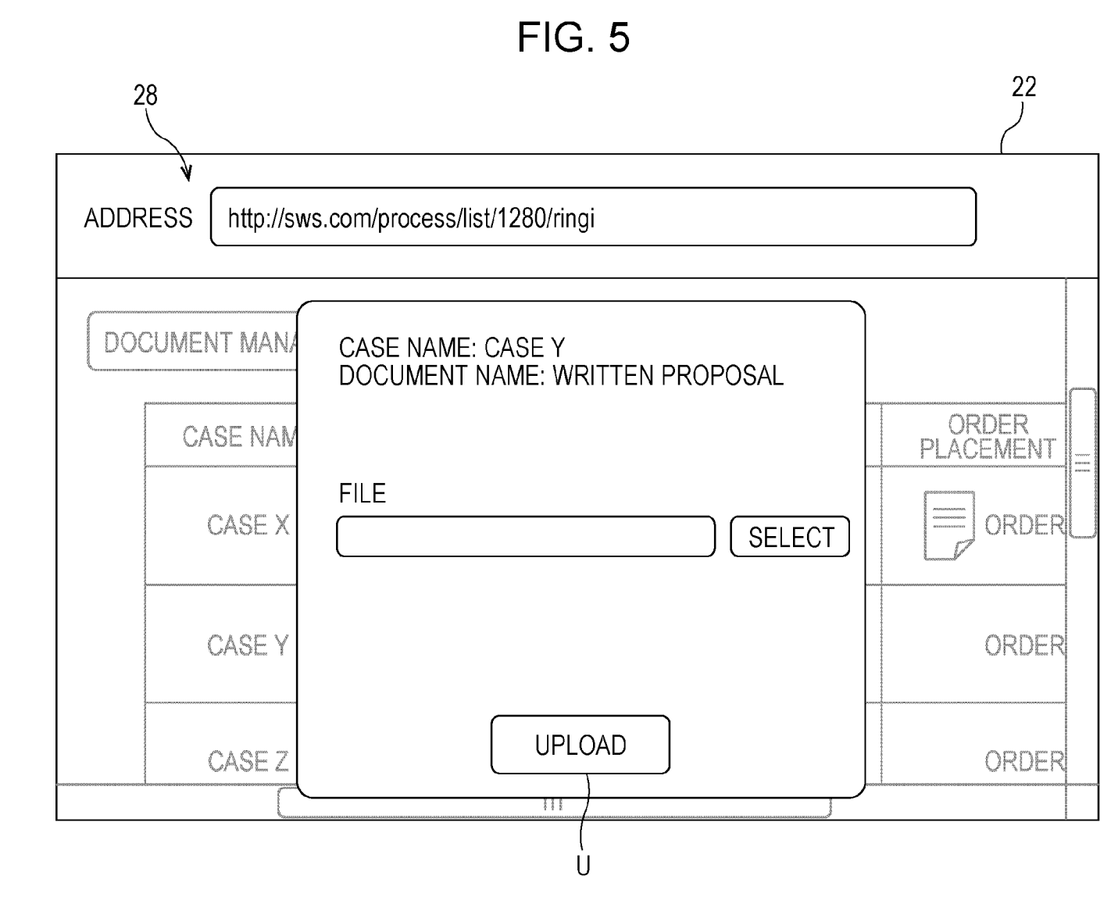
FIG. 5 is a diagram illustrating a second example of the web page provided by the second document management service.

FIG. 5 is a diagram illustrating the web page that is displayed in the browser 28 (i.e., on the display 22) and that corresponds to the storage destination of the electronic document (not yet uploaded) of the trail, that is, the web page for uploading the electronic document of the trail to the storage destination in the second document management service. More specifically, FIG. 5 illustrates a web page that is displayed in the browser 28 when a user selects a cell C that corresponds to the trail "written proposal" of the "case Y" in the web page illustrated in FIG. 4. Note that the URL of this web page is "http://sws.com/process/list/1280/ringi".

In the web page, a desired electronic document is selectable by the user, and the web page includes an upload button U. When the user operates the upload button U after selecting a desired electronic document from the electronic documents stored in the memory 26 of the information processing apparatus 16, the electronic document may be uploaded as the trail to the storage destination in the second document management service.

As described above, in the present exemplary embodiment, the second document management service is capable of managing electronic documents of a plurality of trails and has a function of managing whether electronic documents required for accomplishing tasks have already been uploaded to the second document management service. In contrast, the other document management services including the first document management service are each configured to manage an electronic document that corresponds to a single trail. For example, a written proposal is managed by the first document management service, and a written order is managed by one of the other document management services. Thus, the electronic documents that are managed as trails by the first document management service and the other document management services may be put together and managed by the second document management service. The following description of the present exemplary embodiment will focus on processing for uploading an electronic document managed by the first document management service to the second document management service.

Returning to FIG. 2, the service linkage information 30 is information in which the address of a web page that corresponds to the storage source of an electronic document in one of the document management services accessible from the information processing apparatus 16 and the address of a web page that corresponds to the storage destination of the electronic document in another one of the document management services accessible from the information processing apparatus 16 are associated with each other. In particular, in the service linkage information 30, a download source address that is the address of a web page of one of the document management services that corresponds to the storage source of an electronic document to be downloaded to the information processing apparatus 16 and an upload destination address that is the address of a web page of another one of the document management services that corresponds to the storage destination to which the electronic document is uploaded by the information processing apparatus 16 are associated with each other. For example, in the service linkage information 30, a download source address that corresponds to the storage source of the electronic document in the first document management service and an upload destination address that corresponds to the storage destination of the electronic document in the second document management service are associated with each other.

Figure 6:
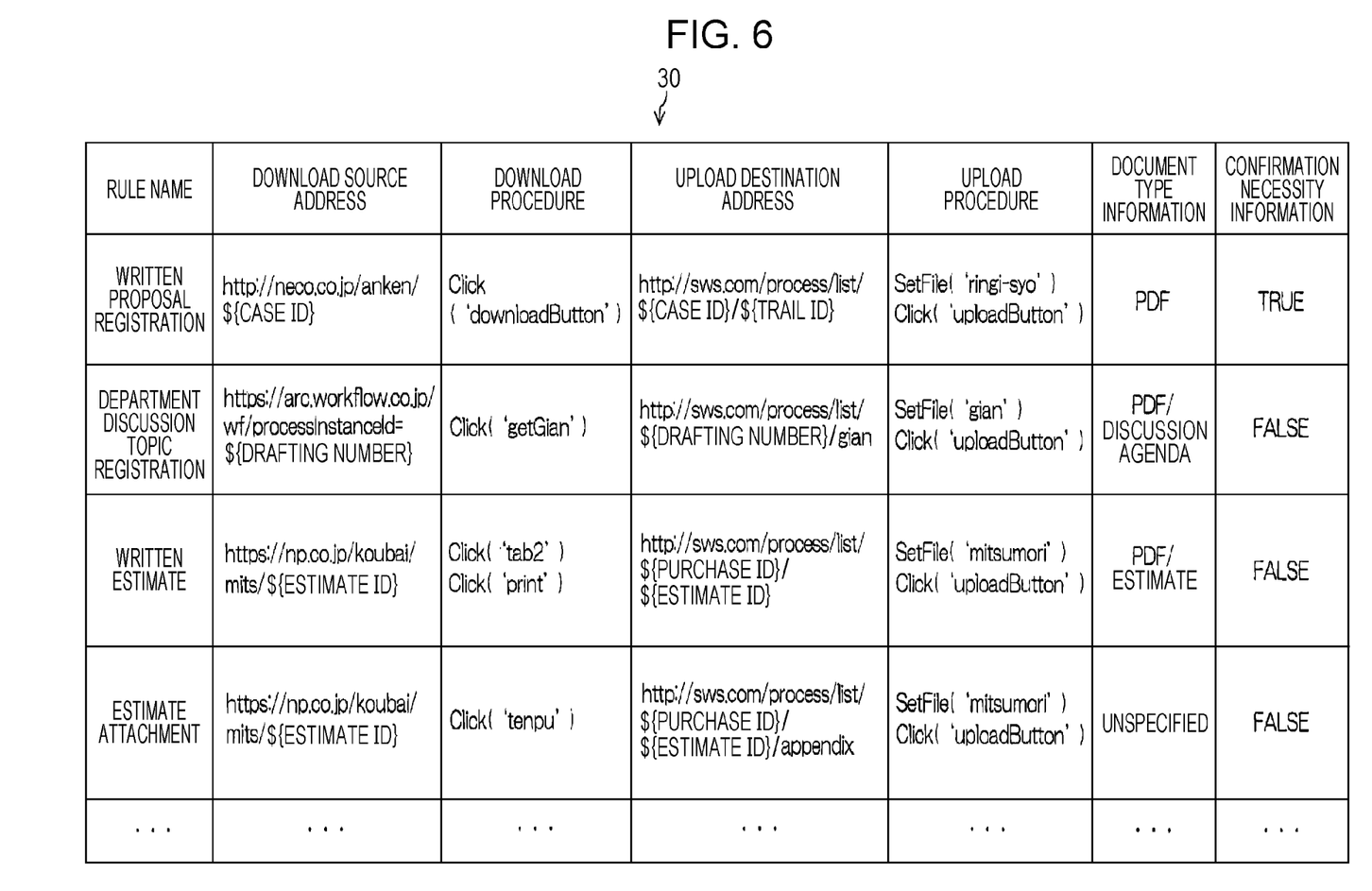
FIG. 6 is a diagram illustrating an example of the contents of service linkage information.

FIG. 6 is a diagram illustrating an example of the contents of the service linkage information 30. As illustrated in FIG. 6, a rule name, a download source address, a download procedure, an upload destination address, an upload procedure, document type information, and confirmation necessity information are associated with one another in the service linkage information 30. The service linkage information 30 is generated beforehand by, for example, an administrator or a user of the information processing system 10 and stored in the memory 26.

A rule name is information that identifies a set of data items associated with each other in the service linkage information 30. In the service linkage information 30, a combination of a download source address and an upload destination address is referred to as a single rule. Each rule name is information that identifies a rule, that is, information that identifies a combination of a download source address and an upload destination address. The service linkage information 30 may include a plurality of rules. In the present exemplary embodiment, the combination of a download source address and an upload destination address changes for each trail, and thus, a rule is set for each trail.

As mentioned above, a download source address is the address of a web page of one of the document management services corresponding to the storage source of an electronic document to be downloaded by the information processing apparatus 16. For example, a download source address "http://neco.co.jp/anken/${case ID}" that is associated with the rule name "written proposal registration" is the address of a web page that corresponds to the storage source of an electronic document in the first document management service.

In the present exemplary embodiment, the download source address contains a first variable indicating an electronic document to be downloaded. In the case of the rule name "written proposal registration" in FIG. 6, "${case ID}" is the first variable in the download source address "http://neco.co.jp/anken/${case ID}". Containing the first variable in the download source address enables a single rule to handle a plurality of electronic documents (i.e., a plurality of storage sources of electronic documents) in the same document management service. As a result, it will not be necessary to create different rules for electronic documents in the same document management service.

A download procedure is a procedure by which the processor 32, which will be described later, downloads an electronic document corresponding to a download source address. A download procedure is written in a programming language so as to be processable by the processor 32, and in the present exemplary embodiment, a download procedure is written in Javascript (Registered Trademark). It may be said that a download procedure is an automated user operation that is performed on the browser 28. For example, the download procedure that is associated with the rule name "written proposal registration" is "Click ('downloadButton')". This indicates clicking a download button in the web page indicated by the download source address.

As mentioned above, an upload destination address is the address of a web page of another one of the document management services corresponding to the storage destination to which an electronic document is uploaded by the information processing apparatus 16. For example, an upload destination address "http://sws.com/process/list/${case ID}/${trail ID}" that is associated with the rule name "written proposal registration" is the address of a web page corresponding to the storage destination of an electronic document in the second document management service.

In the present exemplary embodiment, similar to the download source address, the upload destination address also contains a second variable that indicates an electronic document to be uploaded. In the case of the rule name "written proposal registration" in FIG. 6, "${case ID}" and "${trail ID}" are each the second variable in the upload destination address "http://sws.com/process/list/${case ID}/${trail ID}". Containing such a second variable in the upload destination address enables a single rule to handle a plurality of storage destinations of electronic documents in the same document management service. As a result, it will not be necessary to create different rules for storage destinations of electronic documents in the same document management service.

An upload procedure is a procedure by which the processor 32, which will be described later, uploads an electronic document corresponding to an upload destination address. Similar to a download procedure, an upload procedure is also written in a programming language so as to be processable by the processor 32, and in the present exemplary embodiment, an upload procedure is written in Javascript. It may be said that an upload procedure is also an automated user operation that is performed on the browser 28. For example, the upload procedure that is associated with the rule name "written proposal registration" is "SetFile ('ringi-syo'), Click ('upload Button')". This indicates selecting an electronic document of a written proposal in the web page indicated by the upload destination address and clicking an upload button.

Document type information indicates the document type of an electronic document that may be uploaded to the storage destination corresponding to the upload destination address in accordance with the rule. Examples of the document type of an electronic document include PDF file, Word file, and Excel file.

Confirmation necessity information indicates whether user confirmation is necessary before an electronic document is uploaded to the storage destination corresponding to the upload destination address in accordance with the rule. In the case illustrated in FIG. 6, when the confirmation necessity information is "TURE", it indicates that user confirmation is necessary, and when the confirmation necessity information is "FALSE", it indicates that user confirmation is not necessary.

The processor 32 refers to hardware in a broad sense. Examples of the processor include at least one of general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). The processor 32 is broad enough to encompass one processor or plural processors in collaboration which are located physically apart from each other but may work cooperatively. As illustrated in FIG. 2, the processor 32 exhibits a function of serving as a linkage processing unit 34 by the information processing programs stored in the memory 26. Note that a function that is exhibited by the linkage processing unit 34 may be added to the browser 28 as an additional function (a browser extension, a plug-in, an add-on, or the like).

The linkage processing unit 34 performs linkage processing for linking the plurality of document management services included in the information processing system 10. As mentioned above, the linkage processing in the present specification is processing for uploading an electronic document managed by one of the document management services to another one of the document management services. Specifically, the linkage processing unit 34 links the plurality of document management services together on the basis of the service linkage information 30. More specifically, in the present exemplary embodiment, first, when the browser 28 accesses an upload destination address included in the service linkage information 30, the linkage processing unit 34 downloads, to the information processing apparatus 16, an electronic document that is stored in a storage source in the first document management service corresponding to a download source address that is associated with the upload destination address in the service linkage information 30. In the present specification, this electronic document will be referred to as a target electronic document. Then, the linkage processing unit 34 uploads the downloaded target electronic document to a storage destination in the second document management service corresponding to the upload destination address.

A specific example of the processing that is performed by the linkage processing unit 34 will now be described with reference to FIG. 3, FIG. 5, and FIG. 6. First, assume that a user specifies a URL "http://sws.com/process/list/1280/ringi" in the browser 28, and the browser 28 displays the web page illustrated in FIG. 5. Each time a URL is specified in the browser 28, or each time an object displayed in the browser 28 is changed, the linkage processing unit 34 refers to the service linkage information 30 and determines whether the specified URL is registered as an upload destination address in the service linkage information 30 (see FIG. 6). Note that, in the case where the specified URL is not registered as an upload destination address in the service linkage information 30, the linkage processing unit 34 does not perform the linkage processing.

In this case, the URL specified by the user is "http://sws.com/process/list/1280/ringi", and "http://sws.com/process/list/${case ID}/${trail ID}" is registered as the upload destination address in the service linkage information 30. As mentioned above, "${case ID}" and "${trail ID}" are each the second variable in the upload destination address. In other words, it may be said that the URL specified by the user is an upload destination address that contains "1280" as the value of the second variable "${case ID}" and "ringi" as the value of the second variable "${trail ID}". Thus, the linkage processing unit 34 determines that the URL specified by the user is registered as the upload destination address in the service linkage information 30. Here, the linkage processing unit 34 holds "1280" and "ringi" as the value of the second variable "${case ID}" and the value of the value of the second variable "${trail ID}", respectively.

Next, the linkage processing unit 34 determines a rule that includes the determined upload destination address in the service linkage information 30. Here, the rule name "written proposal registration" is determined. Then, the linkage processing unit 34 acquires a download source address included in the determined rule, that is, the download source address associated with the determined upload destination address. Here, "http://neco.co.jp/anken/${case ID}" is determined to be the download source address.

As mentioned above, "${case ID}" is the first variable in the download source address. The linkage processing unit 34 determines the second variable in the upload destination address that corresponds to the first variable and then sets the value of the first variable to the value of the determined second variable. Here, the second variable "${case ID}" corresponds to the first variable "${case ID}", and thus, the linkage processing unit 34 sets the value of the first variable "${case ID}" in the download source address to "1280". Note that, in this case, the download source address does not include a variable "${trail ID}", and thus, "ringi" that is the value of the second variable "${trail ID}" and that has been held is not used. As a result, the download source address "http://neco.co.jp/anken/1280" including the first variable is generated.

Next, the linkage processing unit 34 accesses the generated download source address by using the browser 28 and downloads the target electronic document that is stored in the storage source in the first document management service corresponding to the download source address to the information processing apparatus 16. More specifically, the linkage processing unit 34 specifies the generated download source address in the browser 28 so as to cause the browser 28 to access the download source address. As a result, the browser 28 displays the web page illustrated in FIG. 3. Then, the linkage processing unit 34 causes the browser 28 to perform processing following the download procedure that is included in the determined rule (the rule name "written proposal registration" in this case). Here, the download button D is clicked. As a result, the target electronic document is downloaded to the information processing apparatus 16 from the storage source in the first document management service. Note that, in the present exemplary embodiment, when the browser 28 accesses the download source address, the browser 28 displays a web page that corresponds to the download source address. However, the web page does not need to be displayed. Note that, if no electronic document is stored in the storage source in the first document management service corresponding to the download source address, the linkage processing unit 34 does not perform a download operation and informs the user that no electronic document is stored in the storage source.

Finally, the linkage processing unit 34 uploads the downloaded target electronic document to the storage destination in the second document management service corresponding to the upload destination address, which is specified by the user. More specifically, the linkage processing unit 34 sets a focus (i.e., a processing target) of the browser 28 to the web page (see FIG. 5) that corresponds to the upload destination address specified by the user and then causes the browser 28 to perform processing following the download procedure that is included in the determined rule. Here, the target electronic document is selected, and the upload button U is clicked. As a result, the target electronic document is uploaded to the storage destination in the second document management service from the information processing apparatus 16.

In the linkage processing, which is performed by the linkage processing unit 34, although the download processing and the upload processing are each automated by a program such as Javascript, the program only automates processing that is performed by the browser 28.

In the case where the document type of the target electronic document is the same as that indicated by the document type information included in the determined rule, the linkage processing unit 34 may upload the target electronic document to the storage destination in the second document management service corresponding to the upload destination address. In other words, the linkage processing unit 34 may be configured not to upload the target electronic document to the second document management service in the case where the document type of the target electronic document is different from that indicated by the document type information included in the determined rule. It may be set beforehand by a user or the like whether to perform document-type determination for determining the document type of the target electronic document.

In the above case, as illustrated in FIG. 3, the document type of the target electronic document is PDF file, and the document type information included in the determined rule "written proposal registration" is "PDF". Thus, the linkage processing unit 34 uploads the target electronic document to the storage destination in the second document management service corresponding to the upload destination address. If the document type of the target electronic document is a document type (e.g., Word file) other than PDF file, the linkage processing unit 34 does not upload the target electronic document to the second document management service on the basis of the second document management service included in the determined rule.

Note that, in the case where the document type information in the service linkage information 30 is "unspecified", the linkage processing unit 34 does not perform the document-type determination.

In addition, in the case where the confirmation necessity information included in the determined rule indicates that user confirmation is necessary, the linkage processing unit 34 may ask a user if the user allows the target electronic document to be uploaded to the storage destination in the second document management service corresponding to the upload destination address before uploading the target electronic document the storage destination. A setting for whether to perform user confirmation may be made beforehand by a user or the like.

In the above-described case, the confirmation necessity information in the determined rule (the rule name "written proposal registration") is "TRUE". Thus, the linkage processing unit 34 asks a user if the user allows the target electronic document to be uploaded to the storage destination in the second document management service before uploading the target electronic document to the storage destination. In the present exemplary embodiment, the linkage processing unit 34 downloads the target electronic document from the first document management service and then outputs a notification to a user for confirmation before uploading the target electronic document to the second document management service.

Figure 7:
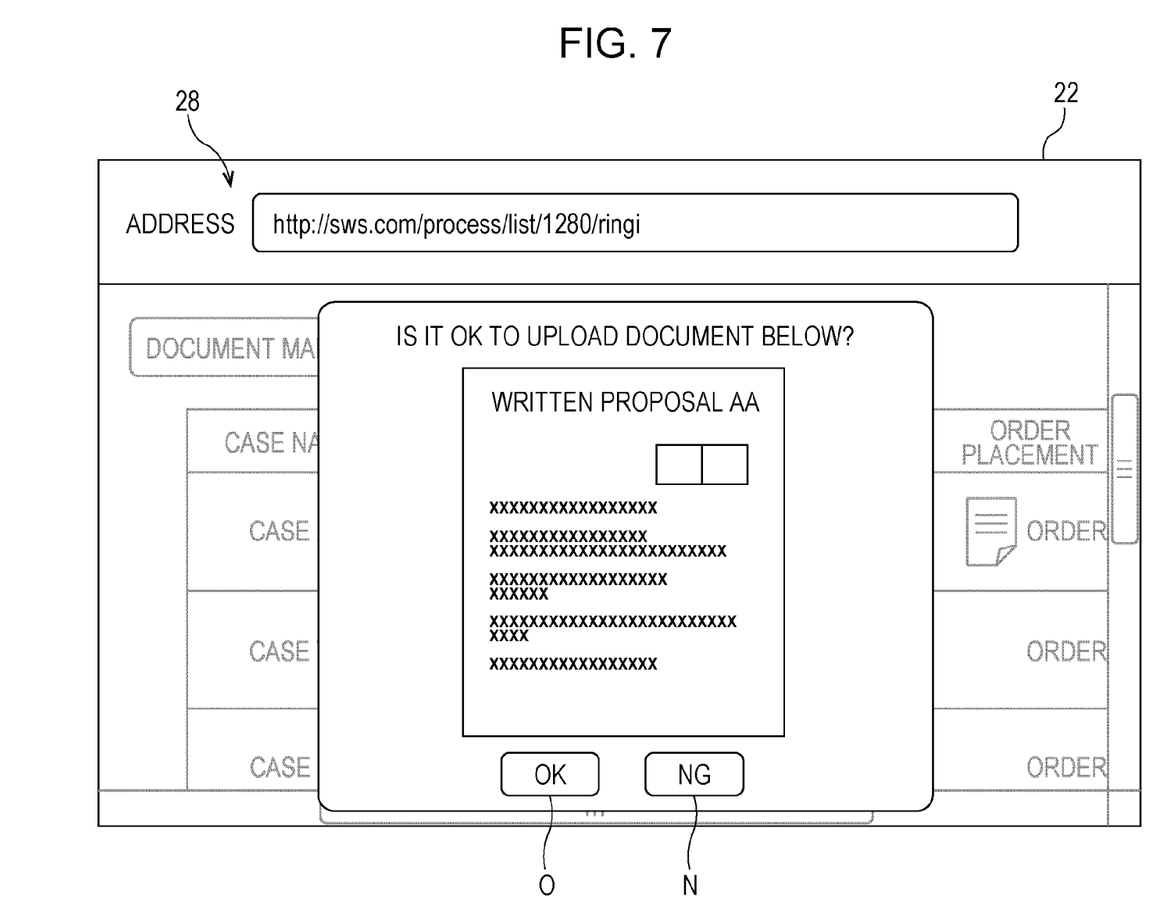
FIG. 7 is a diagram illustrating an example of a user confirmation screen.

More specifically, the linkage processing unit 34 causes the display 22 to display a user confirmation screen such as that illustrated in FIG. 7. The user confirmation screen includes an OK button O and an NG button N. When a user operates the OK button O, the linkage processing unit 34 uploads the target electronic document to the second document management service. When the user operates the NG button N, the linkage processing unit 34 does not upload the target electronic document to the second document management service.

The linkage processing unit 34 may upload the attribute information that is included in the web page corresponding to the download source address to the second document management service in association with the target electronic document. A setting for whether to upload attribute information to the second document management service may also be made beforehand by a user or the like.

The web page illustrated in FIG. 3 as an example of a web page that corresponds to a download source address includes the attribute information in addition to the target electronic document "written proposal AA.pdf" as mentioned above. When the download source address is accessed by the browser 28, the linkage processing unit 34 downloads not only the target electronic document but also information included in the web page corresponding to the download source address. Note that, in the case where the attribute information is also downloaded, a procedure of downloading the attribute information is also included in the download procedure in the service linkage information 30. In the case illustrated in FIG. 3, a filename, a document type, an upload user, an upload date and time, and a comment are downloaded. Then, when the linkage processing unit 34 uploads the target electronic document to the storage destination corresponding to the upload destination address, the linkage processing unit 34 also uploads the attribute information to the second document management service. Note that, in the case where the attribute information is uploaded, a procedure of uploading the attribute information is also included in the upload procedure in the service linkage information 30. The attribute information does not need to be uploaded to the storage destination corresponding to the upload destination address (i.e., the storage destination of the target electronic document) as long as it is uploaded to the second document management service that is associated with the target electronic document.

Uploading the attribute information to the second document management service enables the user to browse the attribute information, which has been managed in the first document management service, in the second document management service.

The overview of the information processing apparatus 16 according to the present exemplary embodiment has been described above. A flow of processing that is performed by the information processing apparatus 16 in the present exemplary embodiment will be described below with reference to the flowchart illustrated in FIG. 8.

Figure 8:
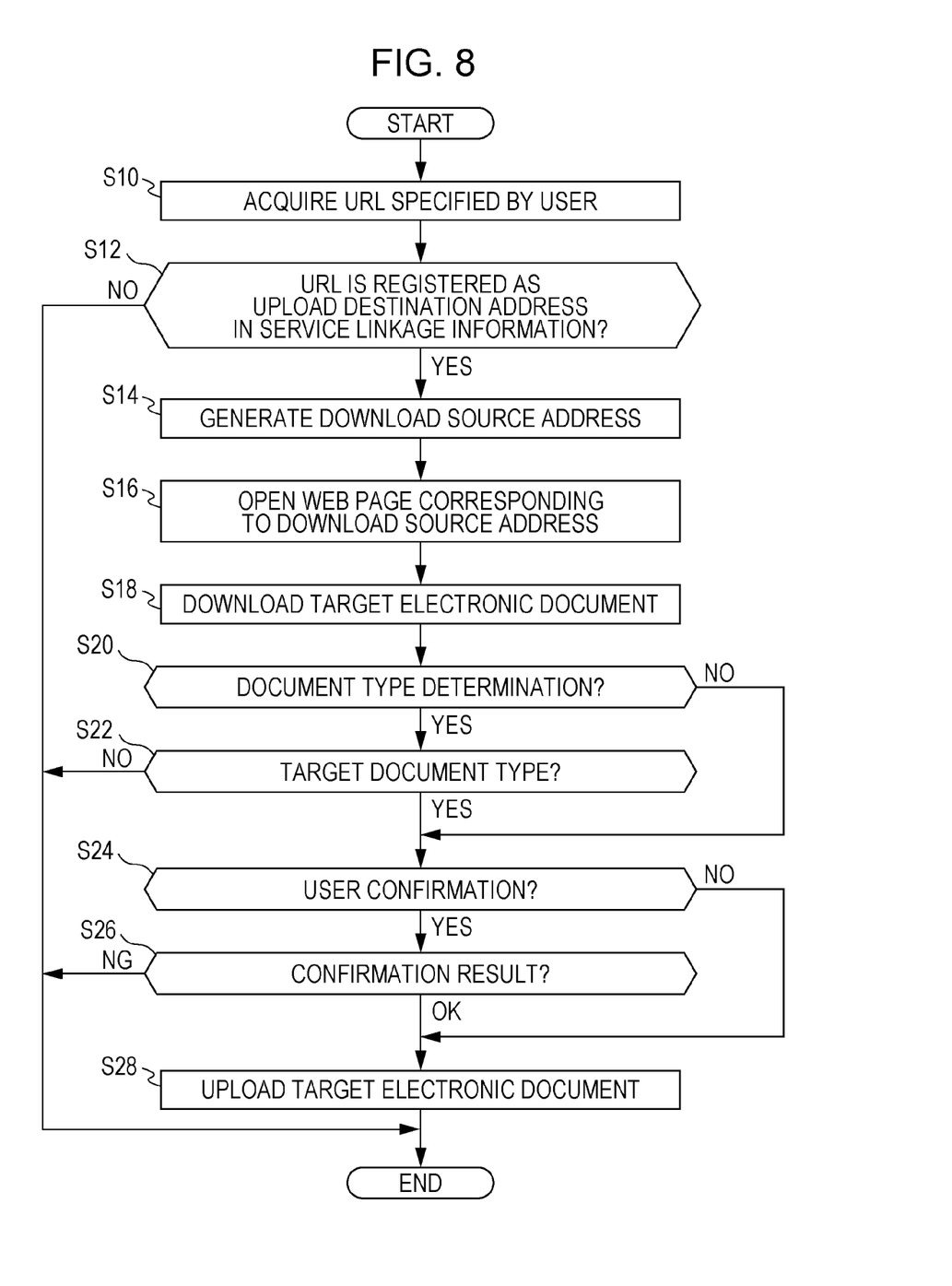
FIG. 8 is a flowchart illustrating a flow of processing performed by the information processing apparatus according to the present exemplary embodiment.

In step S10, the linkage processing unit 34 acquires an URL that is specified in the browser 28 by a user.

In step S12, the linkage processing unit 34 refers to the service linkage information 30 and determines whether the URL acquired in step S10 is registered as an upload destination address in the service linkage information 30. If the URL is registered in the service linkage information 30 as an upload destination address, the process proceeds to step S14, and if the URL is not registered in the service linkage information 30 as an upload destination address, the process is terminated.

In step S14, the linkage processing unit 34 generates a download source address. More specifically, the linkage processing unit 34 determines a rule that includes the upload destination address determined in step S12 in the service linkage information 30 and then acquires a download source address that is included in the rule. If the first variable is included in the acquired download source address, the value of the first variable is set on the basis of the value of the second variable included in the URL acquired in step S10 (processing details are as described above), so that the download source address is generated.

In step S16, the linkage processing unit 34 specifies the download source address generated in step S14 in the browser 28 and accesses the download source address by using the browser 28 so as to open a web page that corresponds to the download source address.

In step S18, the linkage processing unit 34 causes the browser 28 to perform processing following a download procedure that is included in the rule determined in step S14 on the web page opened in step S16. As a result, a target electronic document is downloaded to the information processing apparatus 16 from the storage source in the first document management service.

In step S20, the linkage processing unit 34 determines whether to perform document-type determination. When the information processing apparatus 16 is set to perform the document-type determination, and the document type information in the rule determined in step S14 is not "unspecified", it is determined that the document-type determination is to be performed, and the process proceeds to step S22. When the information processing apparatus 16 is set not to perform the document-type determination, or when the document type information in the rule determined in step S14 is "unspecified" even though the information processing apparatus 16 is set to perform the document-type determination, it is determined that the document-type determination is not to be performed, and the process bypasses step S22 and continues to step S24.

In step S22, the linkage processing unit 34 determines whether the document type of the target electronic document downloaded in step S18 is the same as that indicated by the document type information that is included in the rule determined in step S14. If the document type of the target electronic document is the same as that indicated by the document type information, the process proceeds to step S24. If the document type of the target electronic document is different from that indicated by the document type information, the process is terminated.

In step S24, the linkage processing unit 34 determines whether to perform user confirmation before uploading the target electronic document. When the information processing apparatus 16 is set to perform user confirmation, and the confirmation necessity information in the rule determined in step S14 is "TRUE", it is determined that the document-type determination is to be performed, and the process proceeds to step S26. When the information processing apparatus 16 is set not to perform the user confirmation, or when the confirmation necessity information in the rule determined in step S14 is "FALSE" even though the information processing apparatus 16 is set to perform the user confirmation, it is determined that the user confirmation is not to be performed, and the process bypasses step S26 and continues to step S28.

In step S26, the linkage processing unit 34 asks the user if the user allows the target electronic document to be uploaded to the storage destination. If the result of the user confirmation is OK (i.e., uploading of the target electronic document is allowed), the process proceeds to step S28. If the result of the user confirmation is NG (i.e., uploading of the target electronic document is prohibited), the process is terminated.

In step S28, the linkage processing unit 34 causes the browser 28 to perform processing following the upload procedure included in the rule determined in step S14 in the web page corresponding to the upload destination address specified by the user in step S10. As a result, the target electronic document is uploaded to the storage destination in the second document management service from the information processing apparatus 16.

Although the exemplary embodiment of the present disclosure has been described above, the present disclosure is not limited to the above-described exemplary embodiment, and various changes may be made within the scope of the present disclosure.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
   a processor configured to:
      download, on a basis of service linkage information in which a download source address that corresponds to a storage source of an electronic document in a first document management service and an upload destination address that corresponds to a storage destination of an electronic document in a second document management service, which is different from the first document management service, are associated with each other, a target electronic document that is stored in the storage source corresponding to the download source address associated with the upload destination address to the information processing apparatus when a browser accesses the upload destination address; and
      upload the downloaded target electronic document to the storage destination corresponding to the upload destination address,
   wherein the service linkage information further includes document type information that is associated with the download source address and the upload destination address, the document type information indicating a document type of the electronic document that may be uploaded to the storage destination corresponding to the upload destination address, and
   wherein the processor is configured to upload the target electronic document to the storage destination corresponding to the upload destination address when the document type of the target electronic document is the document type indicated by the document type information associated with the download source address.

2. The information processing apparatus according to claim 1,
   wherein the download source address specified by the service linkage information includes a first variable indicating the electronic document,
   wherein the upload destination address specified by the service linkage information includes a second variable indicating the electronic document, and
   wherein the processor is configured to:
      download, when the browser accesses the upload destination address that includes a predetermined value as a value of the second variable, the target electronic document stored in the storage source corresponding to the download source address that includes the predetermined value as a value of the first variable to the information processing apparatus; and
      upload the downloaded target electronic document to the storage destination corresponding to the upload destination address.

3. The information processing apparatus according to claim 1,
   wherein the service linkage information further includes confirmation necessity information that is associated with the download source address and the upload destination address and that indicates whether user confirmation is necessary, and
   wherein the processor is configured to ask a user, when the confirmation necessity information associated with the upload destination address that is accessed by the browser indicates that user confirmation is necessary, if the user allows the target electronic document to be uploaded to the storage destination corresponding to the upload destination address before uploading the target electronic document to the storage destination.

4. The information processing apparatus according to claim 1,
   wherein the processor is configured to upload attribute information that is included in a web page corresponding to the download source address, which is accessed by the browser, and that indicates an attribute of the target electronic document to the second document management service in association with the target electronic document.

5. A non-transitory computer readable medium storing a program causing a computer to execute a process, the process comprising:
   downloading, on a basis of service linkage information in which a download source address that corresponds to a storage source of an electronic document in a first document management service and an upload destination address that corresponds to a storage destination of an electronic document in a second document management service, which is different from the first document management service, are associated with each other, a target electronic document that is stored in the storage source corresponding to the download source address associated with the upload destination address to the information processing apparatus when a browser accesses the upload destination address; and
   uploading the downloaded target electronic document to the storage destination corresponding to the upload destination address,
   wherein the service linkage information further includes document type information that is associated with the download source address and the upload destination address, the document type information indicating a document type of the electronic document that may be uploaded to the storage destination corresponding to the upload destination address, and
   wherein the target electronic document is uploaded to the storage destination corresponding to the upload destination address when the document type of the target electronic document is the document type indicated by the document type information associated with the download source address.

6. An information processing apparatus comprising:
   means for downloading, on a basis of service linkage information in which a download source address that corresponds to a storage source of an electronic document in a first document management service and an upload destination address that corresponds to a storage destination of an electronic document in a second document management service, which is different from the first document management service, are associated with each other, a target electronic document that is stored in the storage source corresponding to the download source address associated with the upload destination address to the information processing apparatus when a browser accesses the upload destination address; and means for uploading the downloaded target electronic document to the storage destination corresponding to the upload destination address, wherein the service linkage information further includes document type information that is associated with the download source address and the upload destination address, the document type information indicating a document type of the electronic document that may be uploaded to the storage destination corresponding to the upload destination address, and wherein the target electronic document is uploaded to the storage destination corresponding to the upload destination address when the document type of the target electronic document is the document type indicated by the document type information associated with the download source address.

7. An information processing apparatus comprising:
a processor configured to:
  download, on a basis of service linkage information in which a download source address that corresponds to a storage source of an electronic document in a first document management service and an upload destination address that corresponds to a storage destination of an electronic document in a second document management service, which is different from the first document management service, are associated with each other, a target electronic document that is stored in the storage source corresponding to the download source address associated with the upload destination address to the information processing apparatus when a browser accesses the upload destination address; and
  upload the downloaded target electronic document to the storage destination corresponding to the upload destination address,
  wherein the service linkage information further includes confirmation necessity information that is associated with the download source address and the upload destination address and that indicates whether user confirmation is necessary, and
  wherein the processor is configured to ask a user, when the confirmation necessity information associated with the upload destination address that is accessed by the browser indicates that user confirmation is necessary, if the user allows the target electronic document to be uploaded to the storage destination corresponding to the upload destination address before uploading the target electronic document to the storage destination.

8. The information processing apparatus according to claim 7,
  wherein the download source address specified by the service linkage information includes a first variable indicating the electronic document,
  wherein the upload destination address specified by the service linkage information includes a second variable indicating the electronic document, and wherein the processor is configured to:
    download, when the browser accesses the upload destination address that includes a predetermined value as a value of the second variable, the target electronic document stored in the storage source corresponding to the download source address that includes the predetermined value as a value of the first variable to the information processing apparatus; and
    upload the downloaded target electronic document to the storage destination corresponding to the upload destination address.

9. The information processing apparatus according to claim 7,
  wherein the processor is configured to upload attribute information that is included in a web page corresponding to the download source address, which is accessed by the browser, and that indicates an attribute of the target electronic document to the second document management service in association with the target electronic document.

10. A non-transitory computer readable medium storing a program causing a computer to execute a process, the process comprising:
  downloading, on a basis of service linkage information in which a download source address that corresponds to a storage source of an electronic document in a first document management service and an upload destination address that corresponds to a storage destination of an electronic document in a second document management service, which is different from the first document management service, are associated with each other, a target electronic document that is stored in the storage source corresponding to the download source address associated with the upload destination address to the information processing apparatus when a browser accesses the upload destination address; and
  uploading the downloaded target electronic document to the storage destination corresponding to the upload destination address,
  wherein the service linkage information further includes confirmation necessity information that is associated with the download source address and the upload destination address and that indicates whether user confirmation is necessary, and
  wherein a user is asked, when the confirmation necessity information associated with the upload destination address that is accessed by the browser indicates that user confirmation is necessary, if the user allows the target electronic document to be uploaded to the storage destination corresponding to the upload destination address before uploading the target electronic document to the storage destination.

11. An information processing apparatus comprising:
means for downloading, on a basis of service linkage information in which a download source address that corresponds to a storage source of an electronic document in a first document management service and an upload destination address that corresponds to a storage destination of an electronic document in a second document management service, which is different from the first document management service, are associated with each other, a target electronic document that is stored in the storage source corresponding to the download source address associated with the upload destination address to the information processing apparatus when a browser accesses the upload destination address; and means for uploading the downloaded target electronic document to the storage destination corresponding to the upload destination address, wherein the service linkage information further includes confirmation necessity information that is associated with the download source address and the upload destination address and that indicates whether user confirmation is necessary, and wherein a user is asked, when the confirmation necessity information associated with the upload destination address that is accessed by the browser indicates that user confirmation is necessary, if the user allows the target electronic document to be uploaded to the storage destination corresponding to the upload destination address before uploading the target electronic document to the storage destination.

\* \* \* \* \*